No. 737,468. Patented August 25, 1903.

UNITED STATES PATENT OFFICE.

ARTHUR M. PIERCE, OF BROOKLYN, NEW YORK, ASSIGNOR TO BRADFORD L. GILBERT AND WILLIAM H. PEDDLE, OF NEW YORK, N. Y.

PROCESS OF FIREPROOFING WOOD.

SPECIFICATION forming part of Letters Patent No. 737,468, dated August 25, 1903.

Application filed January 6, 1900. Renewed June 4, 1903. Serial No. 160,132. (No specimens.)

*To all whom it may concern:*

Be it known that I, ARTHUR M. PIERCE, a citizen of the United States, residing in Brooklyn, Kings county, State of New York, have invented new and useful Improvements in Processes of Fireproofing Wood, of which the following is a specification.

This invention relates to the processes of rendering wood and similar materials fireproof by impregnating the same with suitable salts, and has for its object to render the process more expeditious, effective, and considerably cheaper.

To attain the desired end, my invention consists, essentially, in saturating the wood with a solution of fireproofing salts in water and alcohol and then drawing off the solution and drying the wood, all of which will be hereinafter first fully described and then pointed out in the claim.

In carrying my invention into effect the wood to be treated is first inclosed in a suitable holder and the air exhausted therefrom. The fireproofing solution, composed of suitable salts, water, and alcohol, is then admitted to the holder containing the wood and the wood thoroughly saturated therewith, either with or without the application of pressure. The solution is then drawn off and the wood dried, when it is ready for use. The alcohol dissolves the resins, &c., contained in the wood and also materially increases the penetrating power of the solution, and when the residue of the solution is drawn off after the wood has become impregnated the resins, &c., are carried therewith, and the alcohol is entirely eliminated in the process of drying the wood.

The alcohol which is used in this process must be one which is readily volatile and which acts as a solvent of resins, such as the more common monatomic alcohols, examples of which are wood spirits or methyl alcohol, the ordinary alcohol of commerce, or ethyl alcohol. The amount or proportion of alcohol employed cannot be stated with precision for all conditions of use, as it varies with the character of the wood operated upon, more alcohol being required when treating a wood containing much resin than in treating a less resinous wood.

The following formula is given as an example of one form of the solution employed: water, eight hundred parts; sulfate of ammonia, one hundred and sixty parts; borax, twenty parts, and alcohol, twenty parts. It is obvious, however, that other proportions of the said ingredients may be used and that other fireproofing salts may be employed without departing from the principle of my invention.

What I claim, and desire to secure by Letters Patent of the United States, is—

The herein-described process of fireproofing wood which consists in saturating the same with a solution of fireproofing salts in water and a monatomic alcohol which is a solvent of resins whereby the resins which may be contained in the wood are dissolved by the alcohol of the solution and the fireproofing salts permeate the wood the more readily and perfectly, and then drawing off the solution and drying the wood.

Signed by me at New York this 4th day of January, 1900.

ARTHUR M. PIERCE.

Witnesses:
 THOS. F. A. GIBNEY,
 C. A. PIERCE.